(12) United States Patent
Kashima et al.

(10) Patent No.: US 6,570,281 B2
(45) Date of Patent: May 27, 2003

(54) STRUCTURE FOR FITTING GENERATOR STATOR TO ENGINE

(75) Inventors: Takao Kashima, Wako (JP); Sadafumi Shidara, Wako (JP); Kazuhiro Satoh, Wako (JP); Hiroki Tawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/776,912

(22) Filed: Feb. 6, 2001

(65) Prior Publication Data

US 2001/0011850 A1 Aug. 9, 2001

(30) Foreign Application Priority Data

Feb. 8, 2000 (JP) ........................................ 2000-035637

(51) Int. Cl.⁷ .............................. H02K 7/02; H02K 5/00; H02K 7/00
(52) U.S. Cl. ........................... 310/74; 310/91; 310/67 R
(58) Field of Search .............................. 310/91, 157, 74, 310/66, 67 R, 112, 113, 266; 123/3; 322/4, 25, 32, 46

(56) References Cited

U.S. PATENT DOCUMENTS

| | | | | |
|---|---|---|---|---|
| 3,947,710 A | * | 3/1976 | Miyamoto | .................. 310/153 |
| 4,114,583 A | * | 9/1978 | Sleder et al. | .......... 123/406.57 |
| 4,146,806 A | * | 3/1979 | Katsumata | .............. 123/149 D |
| 4,203,710 A | * | 5/1980 | Farr | ...................... 123/195 A |
| 4,372,517 A | | 2/1983 | Welch et al. | ................ 248/267 |
| 4,591,746 A | * | 5/1986 | Kamiyama | .............. 123/149 E |
| 5,546,901 A | | 8/1996 | Acker et al. | ............ 123/195 C |
| 5,929,611 A | * | 7/1999 | Scott et al. | .................. 310/184 |
| 5,965,999 A | | 10/1999 | Frank | ............................. 322/1 |
| 6,124,567 A | | 9/2000 | Feldhausen et al. | ..... 219/130.1 |

FOREIGN PATENT DOCUMENTS

| | | |
|---|---|---|
| GB | 2 323 717 | 9/1998 |
| JP | 63-5420 | 2/1988 |

* cited by examiner

Primary Examiner—Nestor Ramirez
Assistant Examiner—Dang Dinh Le
(74) Attorney, Agent, or Firm—Arent Fox Kintner Plotkin & Kahn, PLLC

(57) ABSTRACT

A structure for fitting a generator stator to an engine is provided which allows generator stators having different shapes to be fitted selectively to a common engine main body. In order to selectively fit a first or second generator stator having different shapes from each other to the outside wall of an engine main body, a plurality of first fitting bosses for bolting the first generator stator and a plurality of second fitting bosses for bolting the second generator stator are provided at different positions on the outside wall.

5 Claims, 12 Drawing Sheets

STRUCTURE FOR FITTING GENERATOR STATOR TO ENGINE

BACKGROUND OF THE INVENTION

1. Field of the Invention

The present invention relates to improvements in the structure for fitting a generator stator to an engine in which a generator stator, working together with a rotor fixed to a crankshaft, is fixed by means of bolts to a plurality of fitting bosses formed on an outside wall of the engine main body supporting the crankshaft.

2. Description of the Prior Art

A structure for fitting a generator stator to an engine is known as disclosed in, for example, Japanese Utility Model Registration Publication No. 63-5420.

An engine is sometimes fitted with a power generator having a different form or capacity due to a change in specification, and in such cases the positions of the fitting bosses which are formed on an outside wall of the engine in order to fix the stators of various types of power generator, also vary.

Therefore, a plurality of types of engine main bodies each having fitting bosses which are dedicated to the stator of the corresponding type of power generator have been made, but this results in a reduction in the manufacturing efficiency of the engine main bodies and it has been difficult to lower their cost.

SUMMARY OF THE INVENTION

The present invention has been made in view of the above circumstances, and it is an object of the present invention to provide a structure for fitting a generator stator to an engine which allows generator stators having different shapes to be fitted selectively to a common engine main body, thus contributing to an enhancement of the manufacturing efficiency of the engine main body.

In order to achieve the above object a first characteristic of the invention is that the structure for fitting a generator stator to an engine is provided, in which a generator stator works together with a rotor fixed to a crankshaft, is fixed by means of bolts to a plurality of fitting bosses formed on an outside wall of an engine main body supporting the crankshaft. In order to selectively fit a first or second generator stator having different shapes from each other to the outside wall of the engine main body, a plurality of first fitting bosses for bolting the first generator stator and a plurality of second fitting bosses for bolting the second generator stator, are provided at different positions on the outside wall.

In accordance with the first characteristic, since the first and second generator stators having different shapes from each other can be fitted selectively to the outside wall of the same engine main body, it is unnecessary to prepare special engine main bodies to fit the first and second generator stators, thus enhancing the manufacturing efficiency of engine main bodies and contributing greatly to a reduction in cost.

Furthermore, a second characteristic of the present invention is that the first and second fitting bosses comprise boss main bodies which are integrally moulded with the outside wall and collars which are detachably superimposed on the boss main bodies.

In accordance with the second characteristic, when the first generator stator is bolted to the first fitting bosses, the collars of the second fitting bosses are removed, and when the second generator stator is bolted to the second fitting bosses, the collars of the first fitting bosses are removed. It is thus possible to avoid interference between the first generator stator and the second fitting bosses and between the second generator stator and the first fitting bosses, and it is therefore possible to position the first and second fitting bosses closely to each other.

Furthermore, a third characteristic of the present invention is that the engine main body comprises a crank case which supports one end part of the crankshaft on one side wall thereof and has an opening part for assembling the crankshaft on another side wall thereof and a case cover which is bolted to the crank case to close the opening part. The first and second fitting bosses are provided on the outside wall of the case cover.

In accordance with the third characteristic, since the size of the case cover having integral first and second fitting bosses is far smaller than the crank case, it can be comparatively easily moulded thus further reducing the cost.

DETAILED DESCRIPTION OF THE PREFERRED EMBODIMENT

Figure 1:
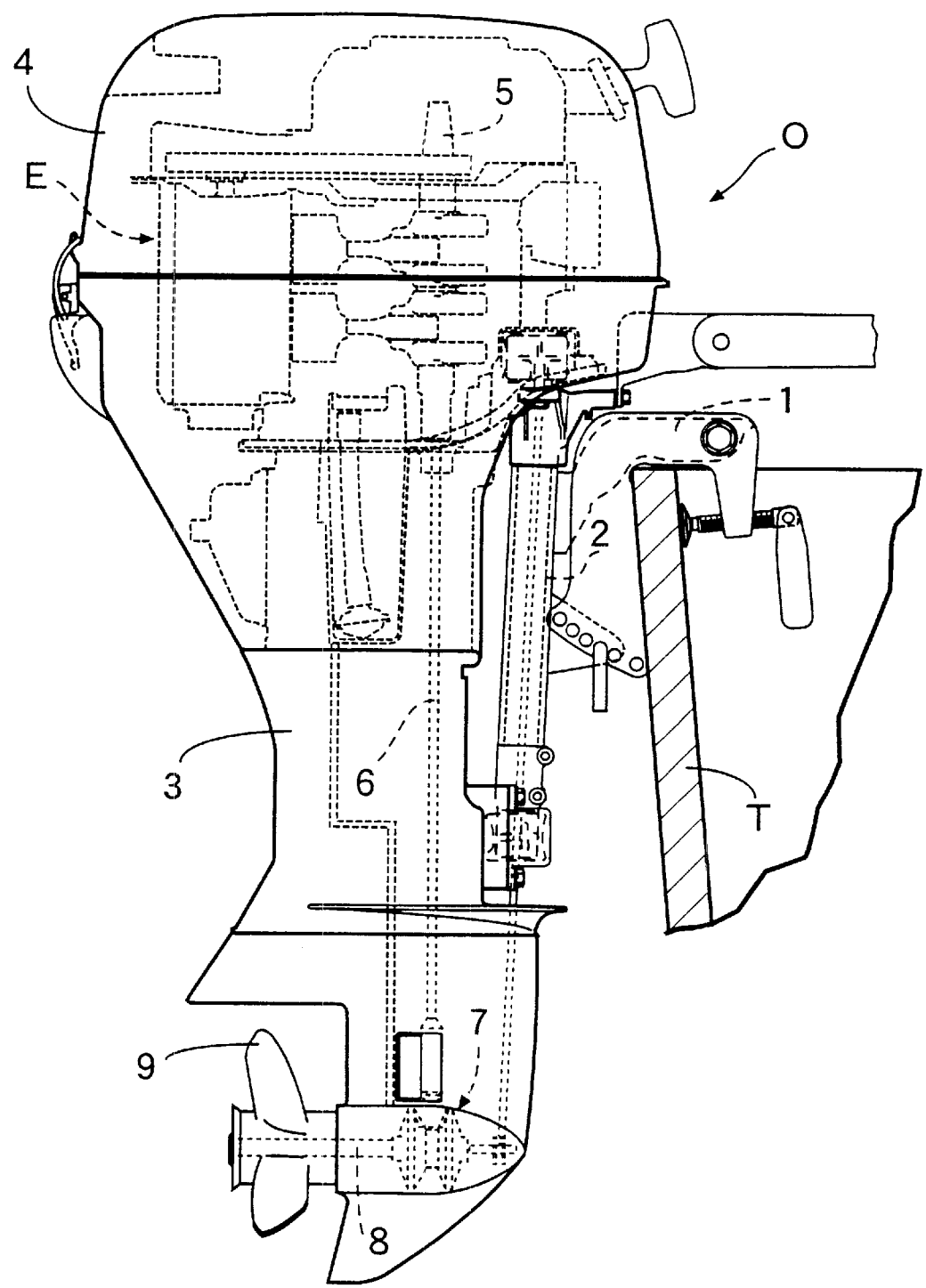
FIG. 1 is a side view of an outboard motor comprising a structure for fitting a generator stator to an engine of the present invention.

In FIG. 1, an outboard motor O comprises a stern bracket 1 which is clamped on a transom T of a hull and a casing 3 extends vertically and is linked to the stern bracket 1 via a swivel shaft 2 so that it can swing in the lateral direction of the hull, an engine E is mounted in the upper part of the casing 3 and an engine cover 4 for covering the engine E, is joined to the casing 3. The power output from a crankshaft 5 of the engine E is transmitted to a propeller shaft 8, which is supported in the lower part of the casing 3, via a driven shaft 6 and a bevel gear transmission 7 which is able to switch between forward and backward travel, and are arranged inside the casing 3 to drive a propeller 9 which is attached to the rear end of the propeller shaft 8.

Figure 2:
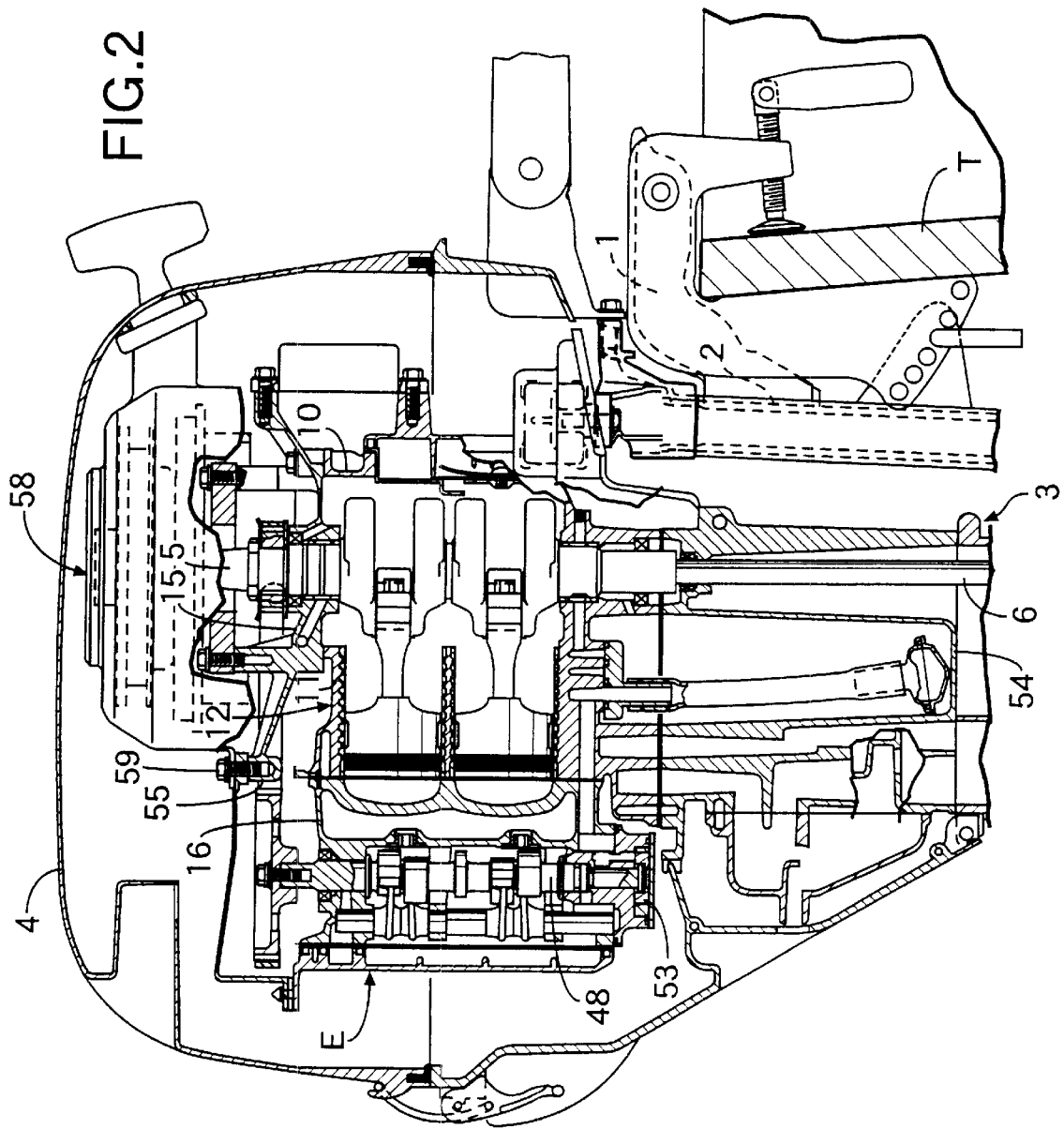
FIG. 2 is a longitudinal sectional view of the engine part of the outboard motor.
Figure 3:
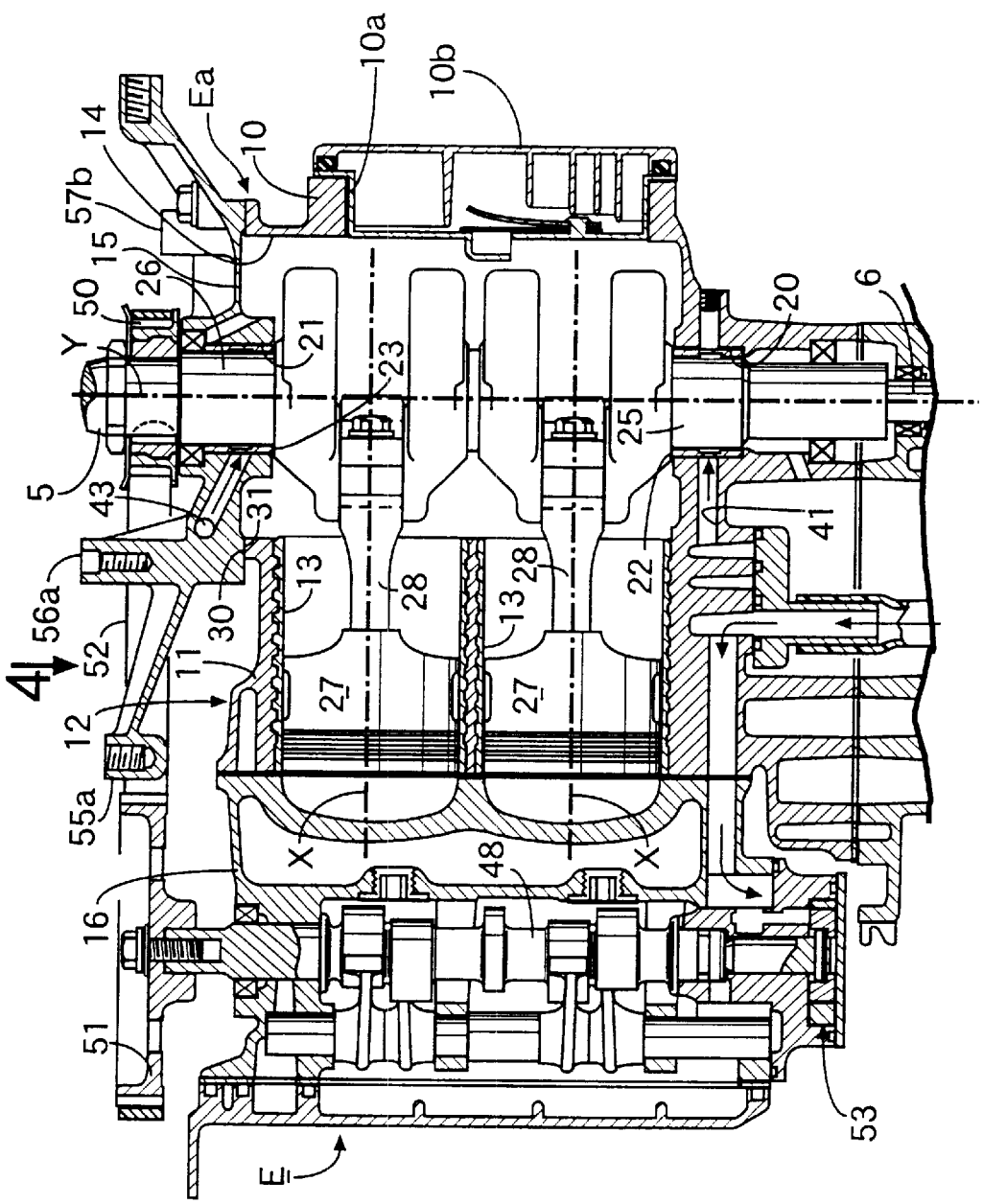
FIG. 3 is an enlarged view of an essential part of FIG. 2.

In FIG. 2 and FIG. 3, the engine E is mounted in the casing 3 so that the crankshaft 5 runs in the vertical direction and a cylinder block 11 faces the rear of the hull. The engine main body Ea of the engine E comprises an engine block 12 which is formed by integrally moulding a crank case 10 and the cylinder block 11, and a pair of top and bottom cylinder bores 13, 13 are provided in the cylinder block 11 so that their axes run in the horizontal direction.

The crank case 10 has a closed bottom wall, and its upper wall has an opening part 14 for assembling the crankshaft 5. A case cover 15 is joined to the crank case 10 to close the opening part 14.

First and second bearing holes 20, 21 are provided in the bottom wall of the crank case 10 and the case cover 15, and a first journal 25 for the lower part of the crankshaft 5 and a second journal 26 for the upper part thereof are supported by first and second bearing bushes 22, 23 which are fitted in the bearing holes 20, 21. Pistons 27 which reciprocate inside the cylinder bores 13, are linked to the crankshaft 5 via connecting rods 28.

The larger ends of the connecting rods 28 have a bifurcated structure. In order to assemble them an operation hole 10a is provided on a side wall of the crank case 10 which is on the opposite side to the cylinder bores 13, and this operation hole 10a is normally blocked by a side cover 10b.

The structure by which the crank case 10 and case cover 15 are joined is explained by reference to FIG. 4 to FIG. 6.

Pairs of positioning holes 32, 33; 34, 35 are provided on the crank case 10 and the case cover 15 respectively to open onto the joining faces 30, 31 thereof. The positioning holes 32, 33; 34, 35 are positioned on both sides of a plane P containing an axis Y of the crankshaft 5 and axes X of the cylinder bores 13, 13, relative to the second bearing bush 23 in the side of the cylinder block 11 to be almost equal distances away from the plane P. Halves of a pair of knock pins 36, 37 are press-fitted into the positioning holes 32, 33 of the crank case 10 and the positioning holes 34, 35 of the case cover 15 are fitted onto the other halves. The position at which the crank case 10 and the case cover 15 are joined is thus defined to arrange the first and second bearing bushes 22, 23 on the same axis.

A large number of screw holes 38 are provided on the crank case 10 which open onto the joining face 30 so as to encompass the opening part 14 and, a large number of bolt insertion through holes 39 are provided on the case cover 15 so as to correspond to the screw holes 38. The crank case 10 and the case cover 15 are joined by screwing and tightening bolts 40 which have been inserted into the bolt insertion through holes 39 into the screw holes 38. A liquid packing is coated on at least one of the joining faces 30, 31 of the crank case 10 and the case cover 15.

One of the knock pins 36 is hollow, and one end of the hollow part 36a is connected to an oil passage 42 formed in the cylinder block 11 and the other end thereof is connected to an oil passage 43 formed in the case cover 15. Therefore, the two oil passages 42, 43 are connected to each other via the hollow part 36a of the knock pin 36. Furthermore, the oil passage 42 of the cylinder block 11 is connected to a lubrication hole 44 of the first bearing bush 22 and the oil passage 43 of the case cover 15 is connected to a lubrication hole 45 of the second bearing bush 23.

Figure 4:
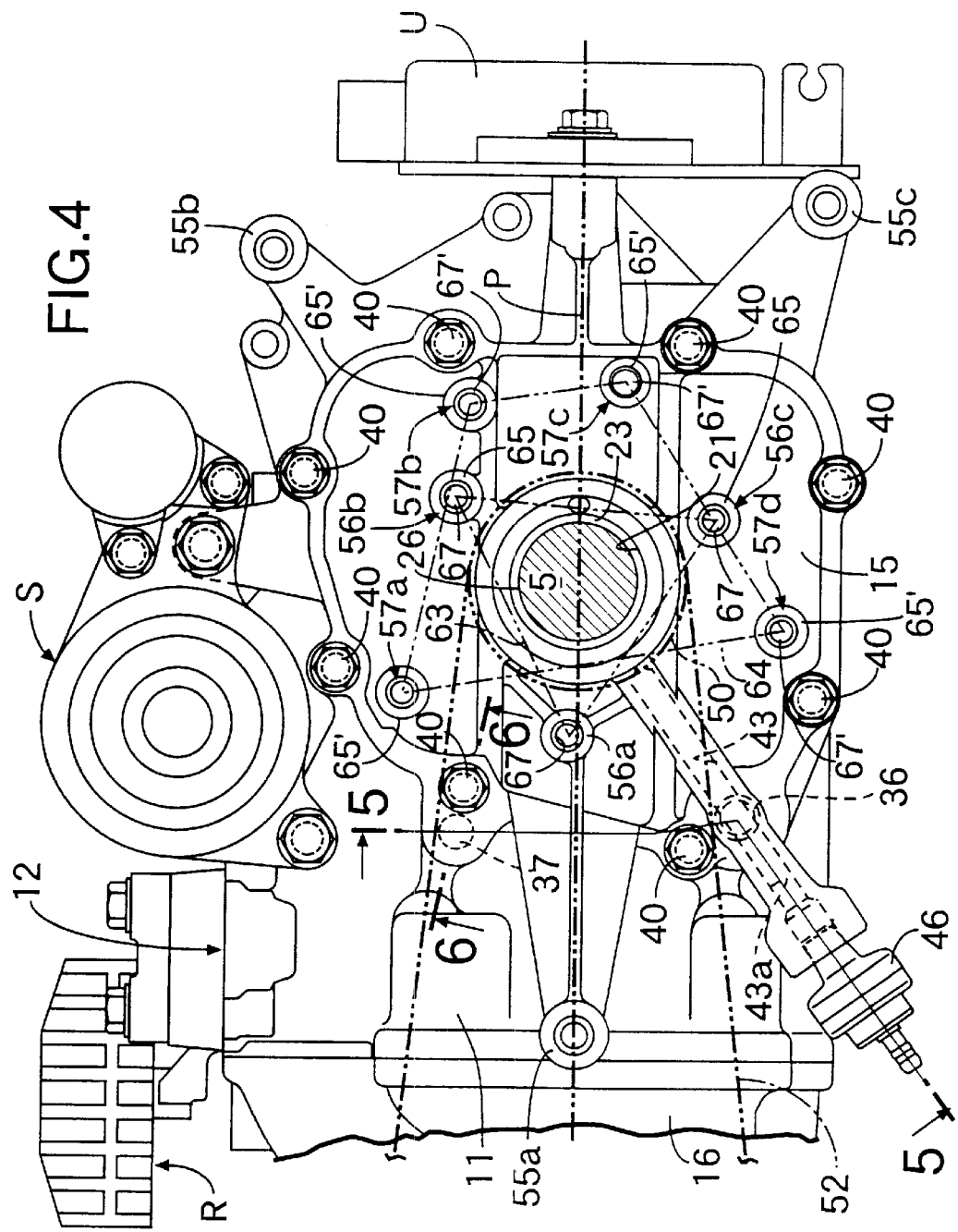
FIG. 4 is a view from an arrow 4 in FIG. 3.
Figure 5:
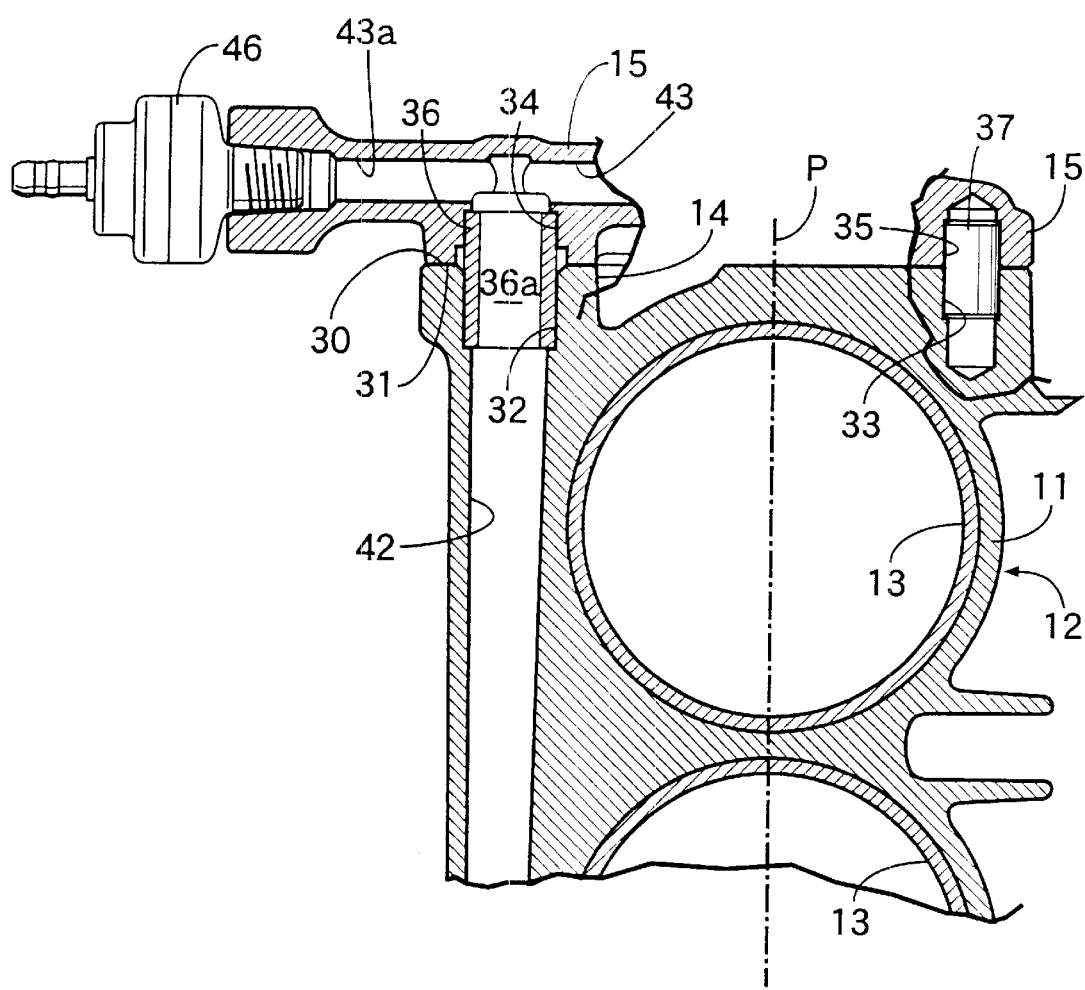
FIG. 5 is a cross-sectional view at line 5—5 in FIG. 4.
Figure 6:
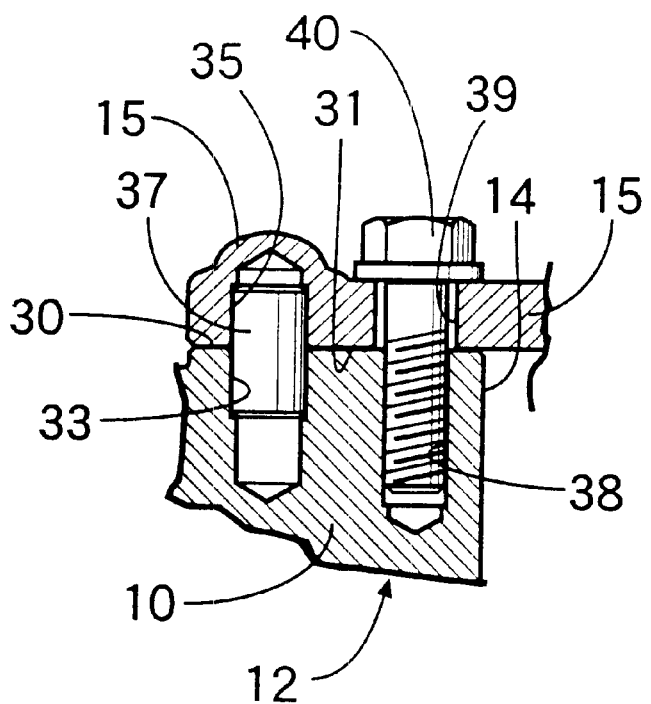
FIG. 6 is a cross-sectional view at line 6—6 in FIG. 4.

As shown in FIG. 4 and FIG. 5, a working hole 43a which has been used for the formation of the oil passage 43, opens onto one side face of the case cover 15, and an hydraulic pressure sensor 46 which detects the discharge pressure of an oil pump 53 through the oil passage 43, is screwed into the opening part. By so doing it is unnecessary to specially provide a hole for fitting the oil pressure sensor 46 on the case cover 15 or the cylinder block 11, and thus the cost can be reduced. Placing the oil pressure sensor 46 so that its forward end faces diagonally behind the outboard motor O, reduces the overhang of the oil pressure sensor 46 outside the engine block 12, which is effective in avoiding any increase in the size of the engine cover 4.

Since the bearing hole 20 to which the bearing bush 22 for supporting the first journal 25 of the crankshaft 5, is attached and the bearing hole 21 to which the bearing bush 23 for supporting the second journal 26 of the crankshaft 5, is attached, are provided on the engine block 12 and the case cover 15 respectively, it is unnecessary to make the two bearing holes 20, 21 together in a state in which two members are joined together, and steps in which the two members are joined and separated become unnecessary. Not only can the production cost be reduced but also the engine block 12 and the case cover 15 can be replaced individually, thereby enhancing the exchangeability. Since lubricating oil is supplied to the second journal 26 of the crankshaft 5 via the oil passages 42, 43 provided on the engine block 12 and the case cover 15 from the oil pump 53, it becomes unnecessary to form an oil passage for lubricating the second journal 26 in the crankshaft 5, which can contribute to the simplification of the oil passage structure inside the crankshaft 5.

Since the crank case 10 having the first bearing bush 22 and the case cover 15 having the second bearing bush 23, are joined by means of a large number of bolts 40 while the respective halves of the knock pins 36, 37 are fitted into the positioning holes 32, 33; 34, 35 which are formed on the joining faces 30, 31 of the crank case 10 and the case cover 15, the crank case 10 and the case cover 15 can be strongly joined in a state in which the first and second bearing bushes 22, 23 are precisely positioned on the same axis, and the first and second journals 25, 26 of the crankshaft 5 can be appropriately supported by the first and second bearing bushes 22, 23.

When a combustion load is applied to the crankshaft 5 from the pistons 27, 27 via the connecting rods 28, 28 during the expansion stroke of the engine E, a shear load works between the joining faces 30, 31 of the crank case 10 and the case cover 15, but the shear stress caused in the knock pins 36, 37 and the frictional force applied between the joining faces 30, 31 by the large number of bolts 40 resist the shear load.

Moreover, since the pair of knock pins 36, 37 are arranged on the side of the cylinder block 11 relative to the second bearing bush 23, when the combustion load is applied from the crankshaft 5 to the case cover 15, a tensile stress is generated over a wide area of the case cover 15 between the second bearing bush 23 and the pair of knock pins 36, 37, and the tensile stress can therefore disperse, and the case cover 15 which thus has a strong resistance to the tensile stress can exhibit high rigidity.

Since the pair of knock pins 36, 37 not only define the joining position for the crank case 10 and the case cover 15, they also contribute to an increase in the rigidity of the case cover 15, and therefore the strength of the support for the crankshaft 5 can be enhanced, the weight of the case cover 15 can also be reduced, and the number of the bolts 40 used can be decreased.

Since the pair of knock pins 36, 37 are positioned in both sides of the plane P containing the axis Y of the crankshaft 5 and the axes X of the cylinder bores 13, 13 to be almost equal distances away from the plane P, by effectively equalising the shear load applied to the two knock pins 36, 37 and dispersing the tensile stress generated in the case cover 15, it is possible to enhance the durability of the knock pins 36, 37 and the case cover 15.

Furthermore, since one of the knock pins 36 has the function of connecting the oil passage 42 of the cylinder block 11 to the oil passage 43 of the case cover 15, it is possible to place the oil passage 42 and the knock pin 36 on the same axis and the oil passage 42 and the knock pin 36 can easily be placed on the small joining faces 30, 31.

Again in FIG. 3, a camshaft 48 for a valve operation which is placed in parallel with the crankshaft 5 is supported on the cylinder head 16 which is joined to the rear end of the cylinder block 11. A drive pulley and a driven pulley 50 and 51 are fixed to the crankshaft 5 and the camshaft 48 respectively above the cylinder head 16 and the case cover 15, a timing belt 52 is wrapped around the drive and driven pulleys 50, 51 and the crankshaft 5 drives the camshaft 48 at a reduction ratio of 1/2.

The oil pump 53 which is driven by the camshaft 48 is mounted to the rear and down from the cylinder block 11. The oil pump 53 siphons oil from an oil pan 54 (see FIG. 2) which is joined to a lower part of the engine block 12 and housed inside the casing 3 and supplies it to the oil passages 42, 43, etc. to lubricate the first and second bearing bushes 22, 23, etc. and the oil which has lubricated each part, returns to the oil pan 54 through a lower part of the crank case 10.

An annular-shaped first generator stator 61 and a rod-shaped second generator stator 62 can selectively be fitted to the outside wall of the case cover 15, and the fitting structure thereof is explained below by reference to FIG. 4 and FIG. 7 to FIG. 12.

In FIG. 4, a plurality of first fitting bosses 56a to 56c which are arranged in positions not interfering with the drive pulley 50 and the timing belt 52, to surround the crankshaft 5 and a plurality of second fitting bosses 57a to 57d which are arranged to be further away from the crankshaft 5 than the first fitting bosses 56a to 56c and surround the crankshaft 5, are provided on the outside face of the case cover 15. In the illustrated embodiment the three first fitting bosses 56a to 56c are provided at the apexes of an equilateral triangle 63 surrounding the crankshaft 5, and the four second fitting bosses 57a to 57d are provided at the apexes of a trapezium 64. Here, the trapezium 64 is placed so that the three fitting bosses 56a to 56c are positioned in the middle parts of the two sloped sides and the bottom side, except for one first fitting boss 56a which is located in the area of the middle part of the bottom side of the trapezium 64. The first and second fitting bosses 56b, 56c; 57a to 57d comprise boss main bodies 65, 65' which are moulded integrally with the case cover 15 and collars 66, 66', which are superimposed on these boss main bodies 65, 65' in a detachable manner. A screw hole 67, 67' is provided in each of the boss main bodies 65, 65'. The boss main bodies 65, 65' are all formed to have an identical height, and the collars 66, 66' are of the same type. The height of the first and second fitting bosses 56b, 56c; 57a to 57d formed by superimposing the collars 66, 66' on the boss main bodies 65, 65' respectively, is thus set so that the upper end faces thereof are positioned outwards in the axial direction relative to the drive pulley 50.

The remaining one first fitting boss 56a is moulded integrally with the case cover 15 so that it has the same height as that of the other first and second fitting bosses 56b, 56c; 57a to 57d, which are formed by superimposing the collars 66, 66' respectively on the boss main bodies 65, 65', and is provided with a screw hole 67.

Figure 7:
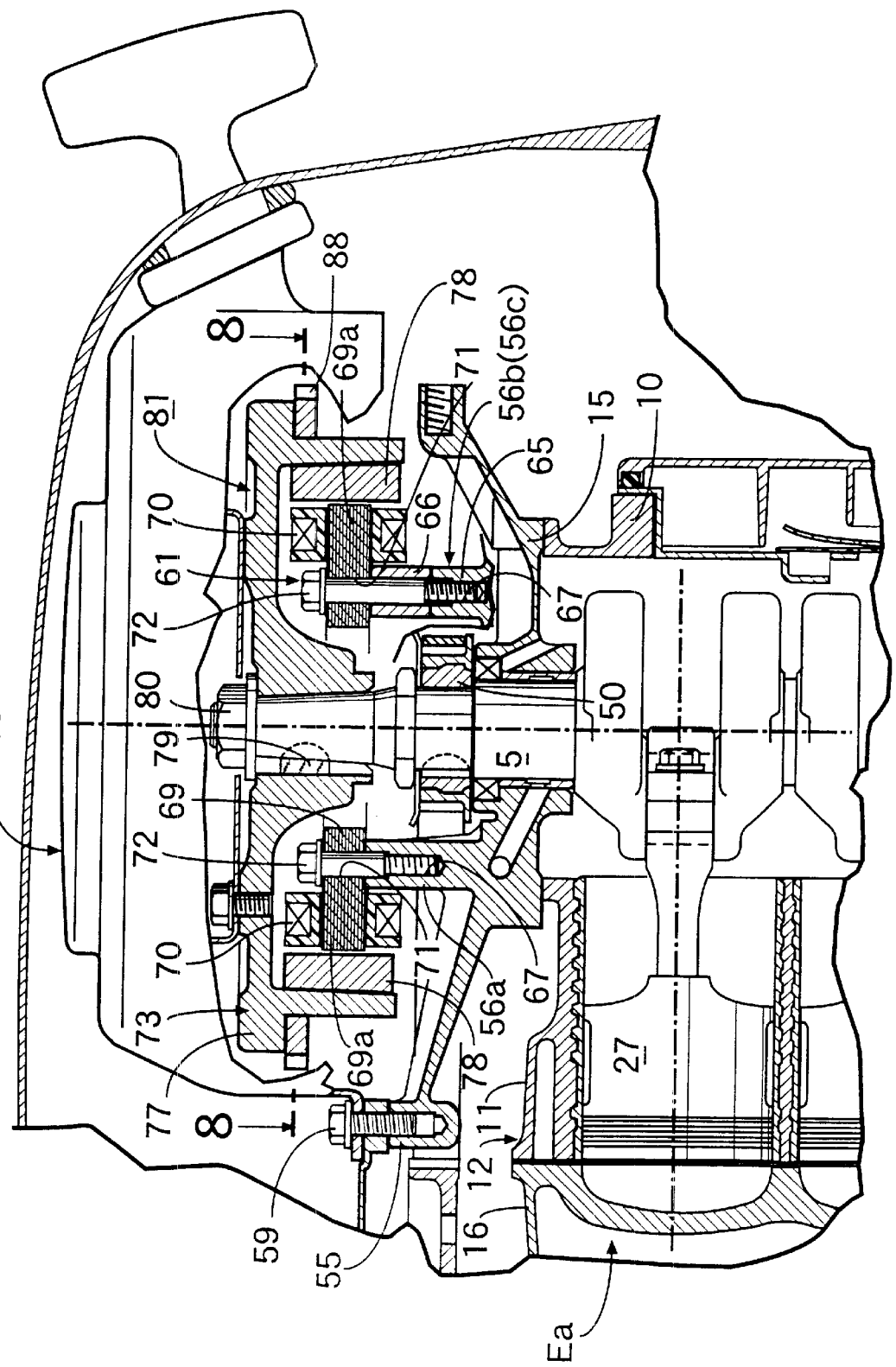
FIG. 7 is a longitudinal sectional view showing a structure for fitting a first generator stator.
Figure 8:
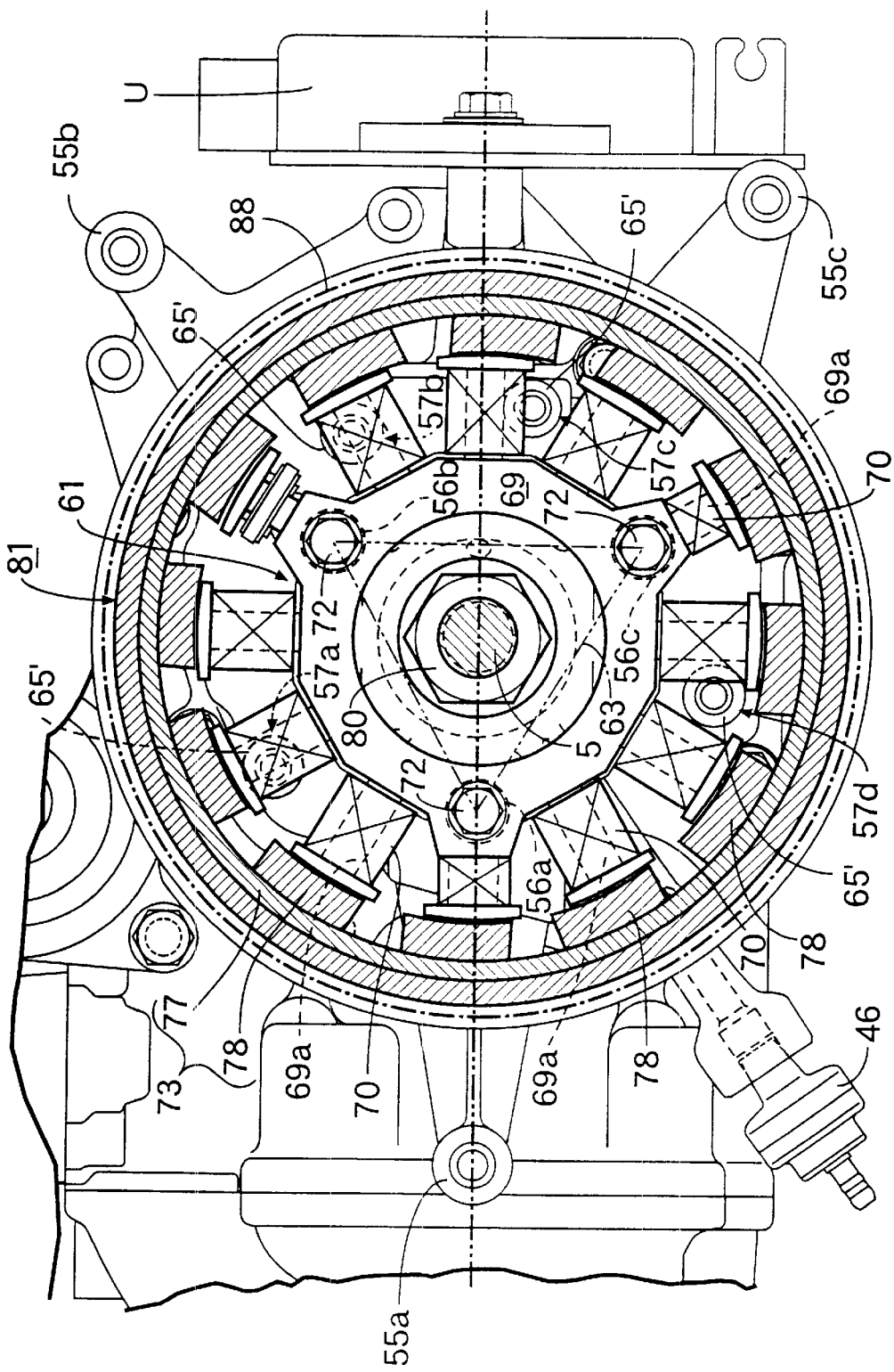
FIG. 8 is a cross-sectional view at line 8—8 in FIG. 7.

As shown in FIG. 7 and FIG. 8, the first generator stator 61 comprises an annular iron core 69 having a large number of poles 69a which project radially from its outer circumference and coils 70 which are wound around the respective poles 69a, and three bolt holes 71 are provided on the iron core 69, which correspond to the three first fitting bosses 56a to 56c.

When fitting the first generator stator 61 to the case cover 15, the collars 66 are first superimposed on the short boss main bodies 65 among the first fitting bosses 56a to 56c to level the upper end faces of all the first fitting bosses 56a to 56c while the collars 66' are removed from the second fitting bosses 57a to 57d. The iron core 69 of the first generator stator 61 is placed on the upper end faces of the three first fitting bosses 56a to 56c while matching the three bolt holes 71 with the screw holes 67 thereof, and bolts 72 which have been inserted into the respective bolt holes 71 are screwed and tightened in the screw holes 67 of the corresponding first fitting bosses 56a to 56c. Some of the coils 70 of the first generator stator 61 fixed to the first fitting bosses 56a to 56c, intersect the positions of the second fitting bosses 57a to 57d, but since the second fitting bosses 57a to 57d only have the short boss main bodies 65', interference between the coils 70 and second fitting bosses 57a to 57d can be avoided.

Figure 9:
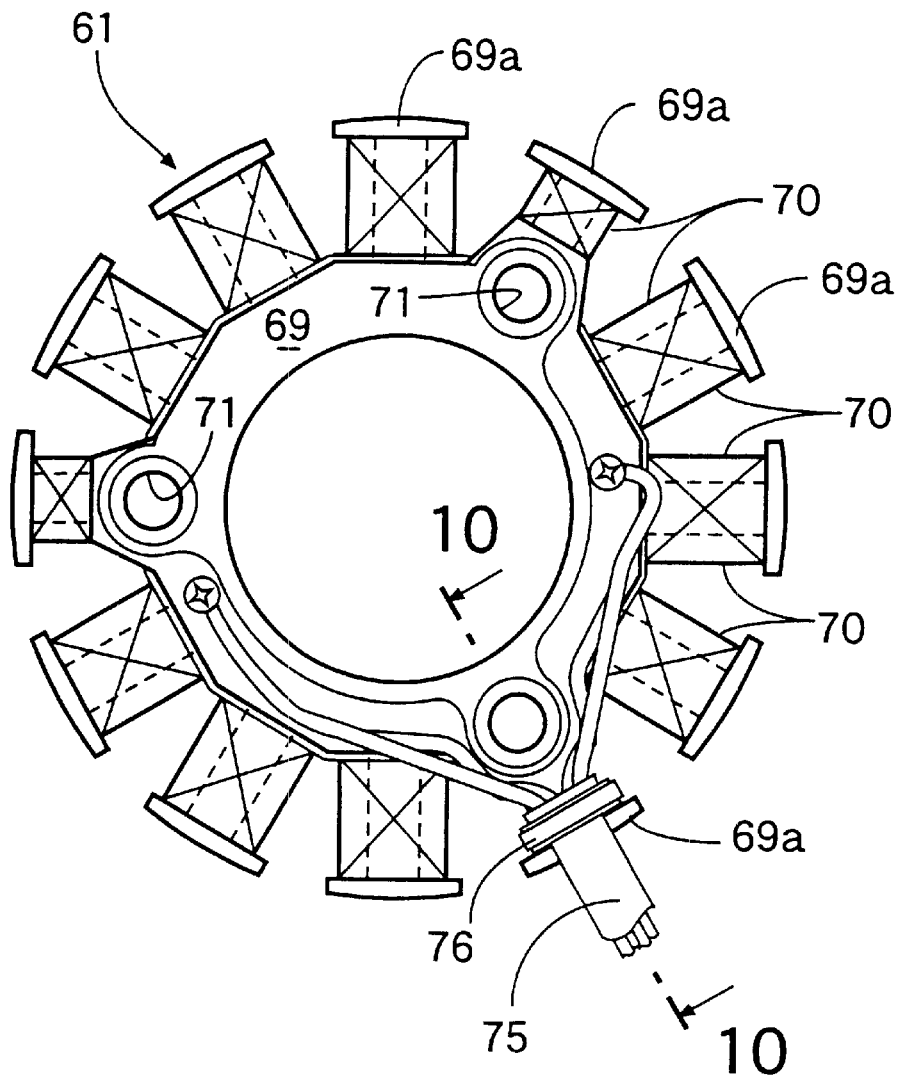
FIG. 9 is an underside view of the first generator stator.
Figure 10:
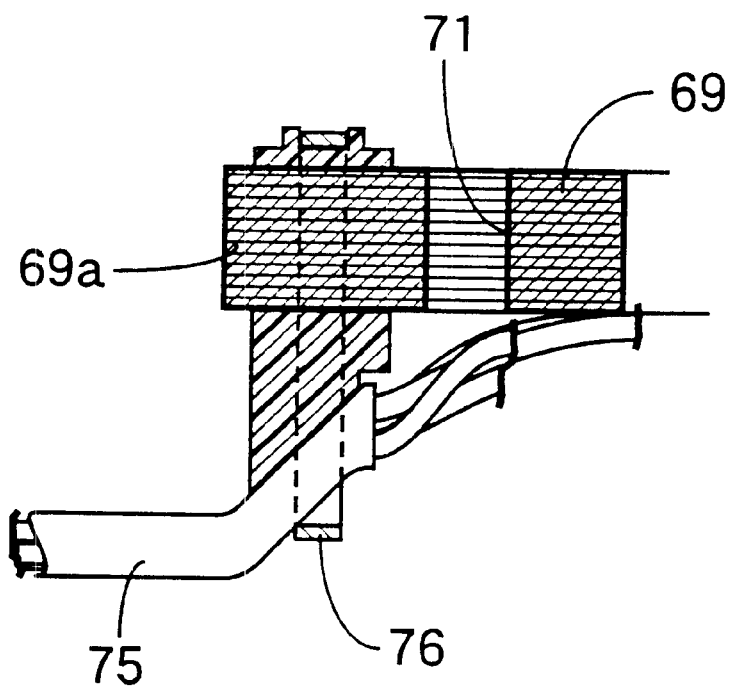
FIG. 10 is a cross-sectional view at line 10—10 in FIG. 9.

In this case, as shown in FIG. 9 and FIG. 10, one of the poles 69a of the first generator stator 61 remains unwound with a coil and lead wires 75a connected to the coils 70 wound around the other poles 69a retained on the lower face of the unwound pole 69a by means of a band 76. Thus it is possible to easily arrange the lead wires 75 while preventing them from interfering with the other members.

In the case where the first generator stator 61 is fitted to the case cover 15, a first rotor 73 which co-operates with the first generator stator 61 is fitted to the crankshaft 5. This first rotor 73 comprises a bottomed cylindrical flywheel 77 which surrounds the first generator stator 61 and a large number of magnets 78 which are fixed on the inner circumference of the flywheel 77. The flywheel 77 is taper-fitted to the crankshaft 5 via a key 79 and fixed by means of a nut 80. A power generator 81 having a 12 volt specification is thus formed from the first generator stator 61 and the first rotor 73.

Figure 11:
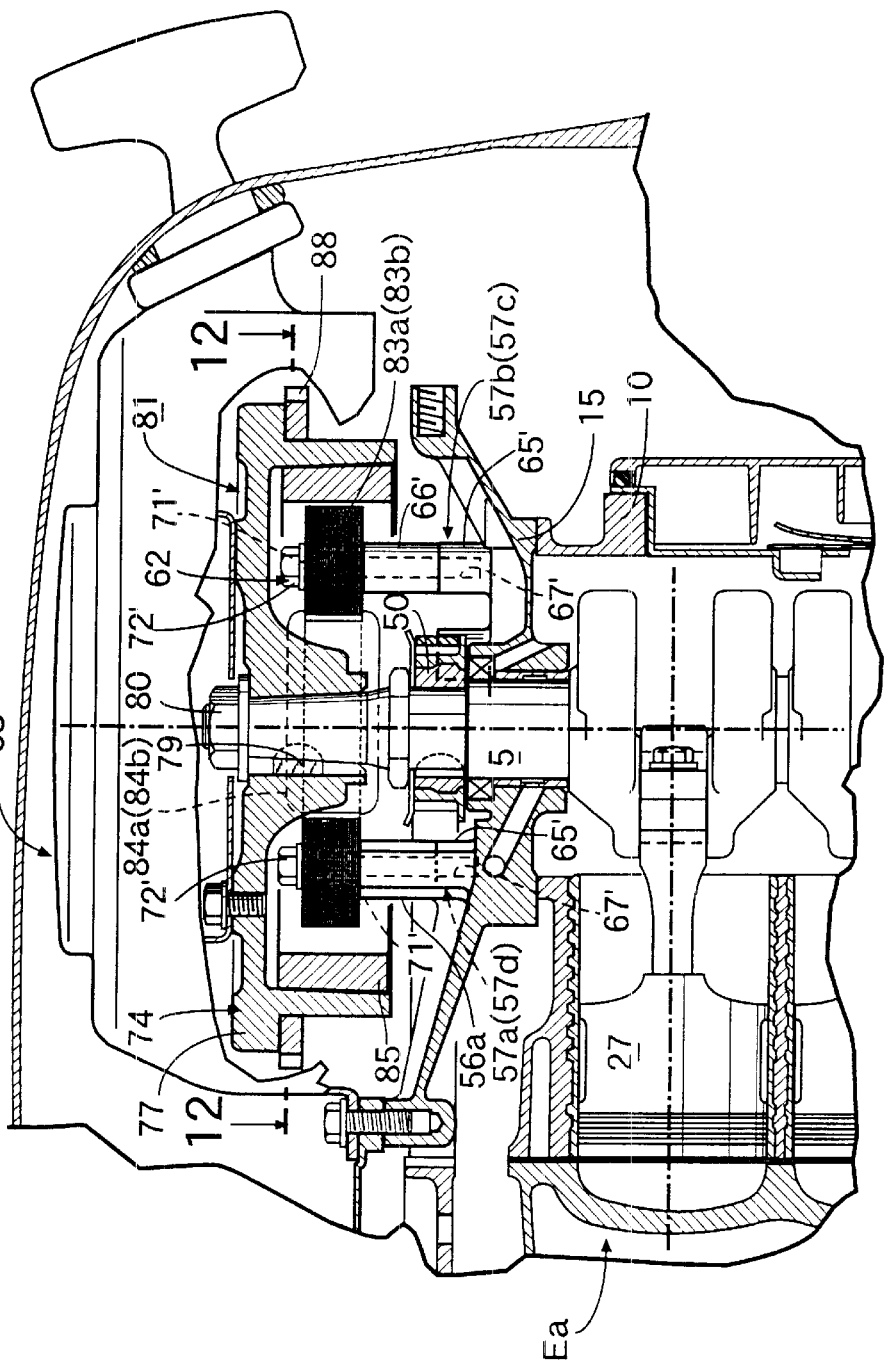
FIG. 11 is a longitudinal sectional view showing a structure for fitting a second generator stator.
Figure 12:
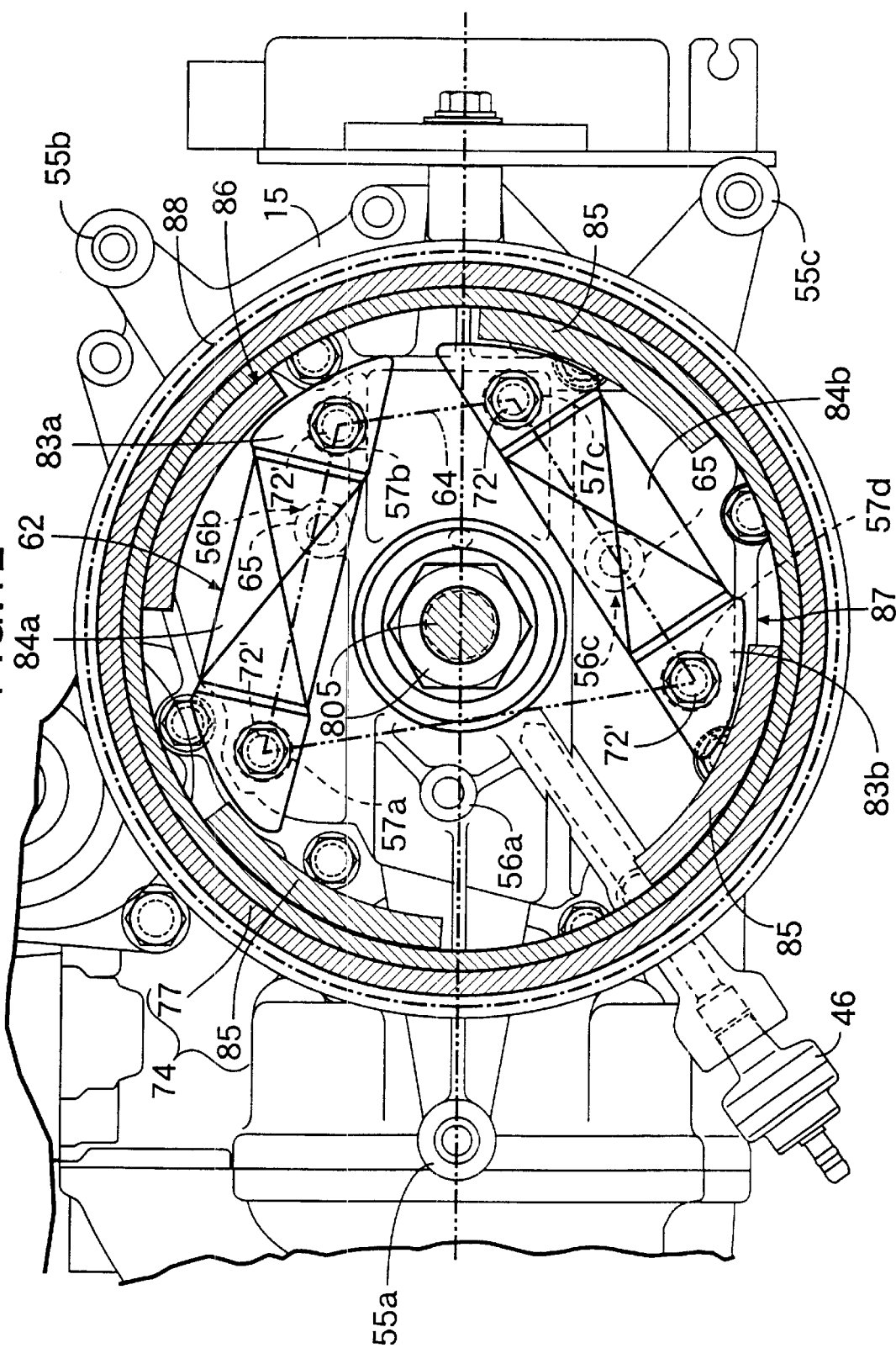
FIG. 12 is a cross-sectional view at line 12—12 in FIG. 11.

On the other hand, as shown in FIG. 11 and FIG. 12 the second generator stator 62 comprises a pair of rod-shaped iron cores 83a, 83b, both ends of which serve as poles and coils 84a, 84b which are wound around the iron cores 83a, 83b. Two bolt holes 71', 71' corresponding to the two second fitting bosses 57a, 57b which are located at both the ends of one of the sloped sides of the trapezium 64, are provided on both the end parts of one of the iron cores 83a and two bolt holes 71', 71' corresponding to the two second fitting bosses 57c, 57d which are located at both the ends of the other one of the sloped sides of the trapezium 64, are provided on both the end parts of the other one of the iron cores 83b.

When fitting the second generator stator 62 to the case cover 15, the collars 66' are firstly superimposed on the boss main bodies 65' of all the second fitting bosses 57a to 57d to level the upper end faces of all the bosses 57a to 57d while the collars 66 are removed from the first fitting bosses 56b, 56c. One of the iron cores 83a is placed on the upper end faces of the two second fitting bosses 57a, 57b which are located at both the ends of one of the sloped sides of the trapezium 64, the other one of the iron cores 83b is placed on the upper end faces of the two second fitting bosses 57c, 57d which are located at both the ends of the other sloped side of the trapezium 64. Bolts 72' which have been inserted into the bolt holes 71' of the iron cores 83a, 83b, are screwed and tightened in the screw holes 67' of the corresponding second fitting bosses 57a to 57d. The coils 84a, 84b of the second generator stator 62 fixed to the second fitting bosses 57a to 57d, intersect the positions of the first fitting bosses 56b, 56c, but since the first fitting bosses 56b, 56c have merely the short boss main bodies 65, interference between the coils 84a, 84b and the first fitting bosses 56b, 56c can be avoided.

In the case where the second generator stator 62 is fitted to the case cover 15, a second rotor 74 which co-operates with the second generator stator 62 is fitted to the crankshaft 5. This second rotor 74 comprises a bottomed cylindrical flywheel 77 which surrounds the second generator stator 62 and four magnets 85 which are fixed on the inner circumference of the flywheel 77. The flywheel 77 is of the same type as that of the flywheel 77 forming the first rotor 73 and is taper-fitted to the crankshaft 5 via a key 79 and fixed by a nut 80 in the same manner as in the first rotor 73. Thus, a power generator 84 for charging having a 6 volt specification, is formed by the second rotor 74 and the set comprising the iron core 83a and the coil 84a of the second generator stator 62, and a power generator 87 for ignition is formed from the second rotor 74 and the other set comprising the iron core 83b and the coil 84b.

It thus becomes possible to selectively fit the first generator stator 61 or the second generator stator 62 having different shapes from each other to the same case cover 15 and it becomes unnecessary to prepare a special case cover 15 to match the first and second generator stators 61, 62 thereby enhancing the manufacturing efficiency of the case cover 15 and contributing greatly to a reduction in cost. The size of the case cover 15 having the integral first fitting boss 56a and the boss main bodies 65, 65' of the first and second fitting bosses 56b, 56c; 57a to 57d, is far smaller than the crank case 10 and it can therefore be moulded comparatively easily, thus further reducing the cost.

Furthermore, since the first and second fitting bosses 56a to 56c; and 57a to 57d are formed so that the upper ends thereof are positioned outwards in the axial direction relative to the drive pulley 50 for the valve operation which is fixed to the crankshaft 5, it is possible to position the drive pulley 50 and the first and second generator stators 61, 62 close to each other while preventing the drive pulley 50 from interfering with the first and second generator stators 61, 62 which are selectively bolted to the first and second fitting bosses 56a to 56c; 57a to 57d, thus contributing to the compactness of the entire engine E.

Referring to FIG. 4, FIG. 7 and FIG. 11 again, a recoil system starter 58 is bolted to the bosses 55a to 55c, which are positioned at the apexes of a triangle located furthermost from the crankshaft 5, on the outside wall of the case cover 15.

In FIG. 4 the symbol U denotes a CDI ignition device, which is fitted to bosses formed on the side cover 10b and the case cover 15. S denotes a starting motor, which drives a ring gear 88 formed on the outer circumference of the flywheel 77 when it is being operated. R denotes a regulator rectifier which is a power source, and all are fitted to the upper wall of the engine block 12.

With regard to the one first fitting boss 56a which is present at a position not interfering with the coils 84a, 84b of the second generator stator 62, its entire body is moulded integrally with the case cover 15 in the above embodiment, but it may be formed in combination with a collar 66 in the same manner as for the other first fitting bosses 56b, 56c. Alternatively, all of the first and second fitting bosses 56a to 56c; 57a to 57d may be moulded integrally with the case cover to all have the same height, and fitting bosses other than the fitting bosses 56a to 56c or 57a to 57d corresponding to the first generator stator 61 or the second generator stator 62 that is to be fitted may be removed. The number of first and second fitting bosses 56a to 56c; 57a to 57d may be chosen freely.

As hereinbefore described, in accordance with the first characteristic of the present invention, in a structure for fitting a generator stator to an engine in which a generator stator, working together with a rotor fixed to a crankshaft, is fixed by means of bolts to a plurality of fitting bosses formed on an outside wall of an engine main body supporting the crankshaft, since a plurality of first fitting bosses for bolting the first generator stator and a plurality of second fitting bosses for bolting the second generator stator are provided at different positions on the outside wall in order to selectively fit a first or second generator stator having different shapes from each other to the outside wall of the engine main body, the first and second generator stators having different shapes from each other can be fitted selectively to the outside wall of the same engine main body. It is therefore unnecessary to prepare special engine main bodies to accommodate the first and second generator stators, thus enhancing the manufacturing efficiency of the engine main body and contributing greatly to a reduction in cost.

Furthermore, in accordance with the second characteristic of the present invention, since the first and second fitting bosses comprise boss main bodies which are integrally moulded with the outside wall and collars which are detachably superimposed on the boss main bodies, when the first generator stator is bolted to the first fitting bosses, the collars of the second fitting bosses are removed and, when the second generator stator is bolted to the second fitting bosses the collars of the first fitting bosses are removed. Thus possible to avoid interference between the first generator stator and the second fitting bosses and between the second generator stator and the first fitting bosses, and it is therefore possible to position the first and second fitting bosses closely to each other.

Furthermore, in accordance with the third characteristic of the present invention, since the engine main body comprises a crank case which supports one end part of the crankshaft on one side wall thereof and has an opening part for assembling the crankshaft on another side wall thereof and a case cover which is bolted to the crank case so as to close the opening part and the first and second fitting bosses are provided on the outside wall of the case cover, the size of the case cover having integral first and second fitting bosses is far smaller than the crank case and, it can therefore be comparatively easily moulded thus further reducing the cost.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A structure for selectively fitting one of first and second generator stators to an engine, wherein the first and second generator stators have different shapes relative to each other, the engine having a main body including an outside wall and a crank shaft supported in the main body, the structure comprising:

a plurality of first and a plurality of second fitting bosses surrounding the crank shaft and being formed on the outside wall of the engine main body supporting the crankshaft therein; and a plurality of bolts that selectively fit one of the first and second generator stators, working together with a rotor fixed to the crankshaft, to corresponding ones of the first and second fitting bosses, wherein the plurality of first fitting bosses used to bolt the first generator stator and the plurality of second fitting bosses used to bolt the second generator stator are located at different positions on the outside wall of the main body, and wherein said first and second fitting bosses are located inside an area defined by an outer periphery of said rotor, as viewed in a direction of an axis of the crankshaft.

2. A structure for fitting first and second generator stators to an engine according to claim 1 wherein the first and second fitting bosses comprise boss main bodies integrally moulded with the outside wall and collars detachably superimposed on the boss main bodies.

3. A structure for fitting first and second generator stators to an engine according to claim 1 or 2 wherein the first fitting bosses are positioned with respect to one another to form a triangle and wherein the second fitting bosses are positioned with respect to one another to form a trapezium.

4. A structure for fitting first and second generator stators to an engine according to claim 2, wherein the engine main body includes a crank case which supports one end part of the crankshaft on one side wall thereof, an opening part for assembling the crankshaft therein on another side wall thereof and a case cover bolted to the crank case to close the opening part and wherein the first and second fitting bosses are located on the outside wall of the case cover.

5. A structure for fitting first and second generator stators to a reciprocating engine wherein the first and second generator stators have different shapes relative to each other, the engine having a main body including an outside wall and a crank shaft supported in the main body, the structure comprising:

a plurality of first and a plurality of second fitting bosses surrounding the crank shaft and being formed on the outside wall of the engine main body supporting the crankshaft therein; and a plurality of bolts that selectively fit one of the first and second generator stators, working together with a rotor fixed to the crankshaft, to corresponding ones of the first and second fitting bosses, wherein the plurality of first fitting bosses used to bolt the first generator stator and the plurality of second fitting bosses used to bolt the second generator stator are located at different positions on the outside wall of the main body, wherein said first and second fitting bosses are located inside an area defined by an outer periphery of said rotor, as viewed in a direction of an axis of the crankshaft, and wherein the engine main body includes a crank case which s upports one end part of the crankshaft on one side wall thereof, an opening part for assembling the crankshaft therein on another side wall thereof and a case cover bolted to the crank case to close the opening part and wherein the first and second fitting bosses are located on the outside wall of the case cover.

* * * * *